US012719040B2

(12) United States Patent
Potyrala et al.

(10) Patent No.: US 12,719,040 B2
(45) Date of Patent: Aug. 25, 2026

(54) SEALING INTERFACE FOR CURTAIN CHAMBER

(71) Applicant: DH Technologies Development Pte. Ltd., Singapore (SG)

(72) Inventors: Stanislaw Potyrala, Mississauga (CA); Bradley B. Schneider, Bradford (CA); Leigh Bedford, Whitby (CA)

(73) Assignee: DH Technologies Development Pte. Ltd., Singapore (SG)

( * ) Notice: Subject to any disclaimer, the term of this patent is extended or adjusted under 35 U.S.C. 154(b) by 373 days.

(21) Appl. No.: 18/684,195

(22) PCT Filed: Aug. 16, 2022

(86) PCT No.: PCT/IB2022/057675
§ 371 (c)(1),
(2) Date: Feb. 16, 2024

(87) PCT Pub. No.: WO2023/021424
PCT Pub. Date: Feb. 23, 2023

(65) Prior Publication Data

US 2024/0222104 A1 Jul. 4, 2024

Related U.S. Application Data

(60) Provisional application No. 63/234,339, filed on Aug. 18, 2021.

(51) Int. Cl.
*H01J 49/04* (2006.01)
*H01J 49/06* (2006.01)
*H01J 49/16* (2006.01)

(52) U.S. Cl.
CPC .......... *H01J 49/044* (2013.01); *H01J 49/045* (2013.01); *H01J 49/067* (2013.01); *H01J 49/165* (2013.01)

(58) Field of Classification Search
CPC ...... H01J 49/044; H01J 49/045; H01J 49/067; H01J 49/165
See application file for complete search history.

(56) References Cited

U.S. PATENT DOCUMENTS 6,593,568 B1 7/2003 Whitehouse et al.
7,923,681 B2 4/2011 Collings et al.
(Continued)

FOREIGN PATENT DOCUMENTS

WO 2009/143616 12/2009
WO 2009/143623 12/2009
(Continued)

OTHER PUBLICATIONS

Barnett et al., "Characterization of a temperature-controlled FAIMS system", Journal of the American Society for Mass Spectrometry, Elsevier, vol. 18, No. 9, Aug. 25, 2007, pp. 1653-1663.
(Continued)

*Primary Examiner* — Georgia Y Epps
*Assistant Examiner* — Hanway Chang
(74) *Attorney, Agent, or Firm* — Merchant & Gould P.C.

(57) ABSTRACT

A curtain chamber includes an orifice plate defining an orifice plate bore. A curtain plate is disposed adjacent to the orifice plate and defines a curtain plate bore. The orifice plate bore is disposed adjacent the curtain plate bore. A biasing element includes a first portion disposed in the orifice plate bore and a second portion disposed in the curtain plate bore. The biasing element biases the curtain plate towards the orifice plate. A race is defined by at least one of the orifice plate and the curtain plate. The race defines a race depth. A seal is disposed in the race. The seal includes an uncompressed seal depth greater than the race depth and a compressed seal depth less than the uncompressed seal depth.

20 Claims, 6 Drawing Sheets

(56) References Cited

U.S. PATENT DOCUMENTS

| | | | |
|---|---|---|---|
| 9,305,762 | B2 | 4/2016 | Covey |
| 9,425,031 | B2 | 8/2016 | Schneider |
| 9,846,143 | B2 | 12/2017 | Blagojevic |
| 10,276,358 | B2 | 4/2019 | Wu |
| 10,770,277 | B2 | 9/2020 | Datwani et al. |
| 2003/0052263 | A1 | 3/2003 | Kaufman et al. |
| 2003/0062474 | A1 | 4/2003 | Baranov et al. |
| 2004/0206901 | A1 | 10/2004 | Chen |
| 2005/0029449 | A1 | 2/2005 | Miller |
| 2005/0040330 | A1 | 2/2005 | Kaufman |
| 2005/0178964 | A1 | 8/2005 | Guevremont et al. |
| 2005/0194532 | A1 | 9/2005 | Guevremont |
| 2006/0124846 | A1 | 6/2006 | Covey |
| 2008/0073502 | A1 | 3/2008 | Schneider |
| 2009/0152458 | A1 | 6/2009 | Vilkov et al. |
| 2009/0294648 | A1 | 12/2009 | Schneider |
| 2009/0294650 | A1 | 12/2009 | Schneider |
| 2010/0237233 | A1 | 9/2010 | Covey |
| 2010/0282966 | A1 | 11/2010 | Schneider et al. |
| 2011/0183431 | A1 | 7/2011 | Covey |
| 2014/0339416 | A1 | 11/2014 | Vidal-De-Miguel et al. |
| 2016/0118234 | A1 | 4/2016 | Covey |
| 2016/0187296 | A1 | 6/2016 | Blagojevic |
| 2017/0053789 | A1 | 2/2017 | Allsworth |
| 2018/0269048 | A1 | 9/2018 | Jarvis |
| 2019/0086363 | A1 | 3/2019 | Covey |
| 2019/0157060 | A1 | 5/2019 | Datwani |
| 2021/0005441 | A1 | 1/2021 | Booy |
| 2021/0366699 | A1 | 11/2021 | Capbell et al. |
| 2023/0176010 | A1 | 6/2023 | Covey |
| 2023/0288372 | A1 | 9/2023 | Leigh |
| 2024/0085373 | A1 | 3/2024 | Campbell et al. |
| 2024/0175846 | A1 | 5/2024 | Covey |
| 2024/0255467 | A1 | 8/2024 | Bedford |
| 2024/0282564 | A1 | 8/2024 | Bedford |

FOREIGN PATENT DOCUMENTS

| | | |
|---|---|---|
| WO | 2012/167254 | 12/2012 |
| WO | 2013/171571 | 11/2013 |
| WO | 2015/022573 | 2/2015 |
| WO | 2016/108126 | 7/2016 |
| WO | 2017/093898 | 6/2017 |
| WO | 2017/158534 | 9/2017 |
| WO | 2021/156775 | 8/2021 |
| WO | 2022/201038 | 9/2022 |
| WO | 2022/269517 | 12/2022 |
| WO | 2023/119062 | 6/2023 |

OTHER PUBLICATIONS

Cumeras, R. et al., "Review on Ion Mobility Spectrometry. Part 1: Current Instrumentation", Analyst, vol. 140, No. 5, Jan. 1, 2015, pp. 1376-1390.

Hager et al., Product ion scanning using a Q-q-Q linear ion trap (Q Trap) mass spectrometer, Rapid Communications in Mass Spectrometry (2003; 17: 1056-1064).

Ieritano, Christina et al., "Determining Collision Cross Sections from Differential Ion Mobility Spectrometry", Analytical Chemistry, vol. 93, No. 25, Jun. 29, 2021, pp. 8937-8944.

Krylov et al., "Temperature effects in differential mobility spectrometry", International Journal of Mass Spectrometry, Elsevier, vol. 279, No. 2-3, Jan. 15, 2009, pp. 119-125.

PCT International Search Report and Written Opinion in International Application PCT/IB2022/057675, mailed Jan. 10, 2023, 18 pages.

Porta et al., "Gas-phase separation of Drugs and Metabolites using Modifier-Assisted Differentail Ion Mobiliity Spectrometry Hyphenated to Liquid Extraction Surface Analysis and Mass Spectrometry", Anal. Chem., 2013, 85, 24, 11771-11779.

Rajapaske et al., "Automated chemical identification and library building using dispersion plots for differentail mobility spectrometry", Analytical Methods, vol. 10, No. 35, Jan. 1, 2018, pp. 4339-4349.

Schnedier et al., "DMS-MS Separations with Different Transport Gas Modifiers", Int. J. Ion Mobile. Spec (2013) 16: 207-2016.

Schneider et al., "Chemical Effects in the Separation Process of a DMS/MS System", Anal. Chem. 2010, 82, 1867-1880.

Schneider et al., "Differential Mobility Spectrometry/Mass Spectrometry History, Theory, Design Optimization, Simulations, and Applications", Mass Spectrom Rev, 2016, 35(6): 687-737.

Wei et al., "Effects of Solvent Vapor Modifiers for the Separation of Opiod Isomers in Micromachined FAIMS-MS", J. Am. Soc. Mass Spectrom. (2019) 30: 731-742.

PCT International Preliminary Report on Patentability in International Application PCT/IB2022/057675, mailed Feb. 29, 2024, 11 pages.

SEALING INTERFACE FOR CURTAIN CHAMBER

CROSS-REFERENCE TO RELATED APPLICATION

This application is a National Stage Application of PCT/IB2022/057675, filed on Aug. 16, 2022, which claims the benefit of U.S. Provisional Application No. 63/234,339, filed on Aug. 18, 2021, the entire disclosures of which are incorporated herein by reference in their entireties. To the extent appropriate, a claim of priority is made to each of the above disclosed applications.

BACKGROUND

Mass spectrometers (MS), differential mobility spectrometers (DMS), and combination analyzers (DMS-MS) use curtain gas flows for protection of the mass spectrometer vacuum inlet and declustering. These analytical instruments include a curtain chamber prior to the vacuum inlet and a curtain plate that separates the ion source from the curtain chamber. The curtain chamber includes a gas port for providing a flow of clean nitrogen curtain gas. The volumetric flow of curtain gas is sufficiently higher than the instrument gas throughput such that a portion flows out of an aperture in the curtain plate, counter-current to ion motion. Existing systems display some limitations with regard to sealing the curtain chamber that can negatively affect system performance, particularly. Further, additional heating within the ion source or curtain chamber increases the temperature of the curtain plate sufficiently, which can lead to outgassing. As such, curtain chambers may include screws to physically attach the curtain plate to the orifice plate and press the plate against the seal to achieve a reproducible seal.

SUMMARY

In one aspect, the technology relates to a curtain chamber including: an orifice plate defining an orifice plate bore; a curtain plate disposed adjacent to the orifice plate and defining a curtain plate bore, wherein the orifice plate bore is disposed adjacent the curtain plate bore; a biasing element including a first portion disposed in the orifice plate bore and a second portion disposed in the curtain plate bore, wherein the biasing element biases the curtain plate towards the orifice plate; a race defined by at least one of the orifice plate and the curtain plate, and wherein the race defines a race depth; and a seal disposed in the race and wherein the seal includes an uncompressed seal depth greater than the race depth and a compressed seal depth less than the uncompressed seal depth. In an example, the biasing element includes a ball plunger including a body, a ball at least partially disposed in the body, and a spring for biasing the ball at least partially out of the body. In another example, the first portion of the biasing element includes the ball plunger body. In yet another example, the seal includes a Teflon element. In still another example, the seal has an E-shaped cross-sectional profile having a plurality of arms spaced apart by a plurality of openings.

In another example of the above aspect, the seal includes a spring disposed in each of the plurality of openings of the E-shaped cross-sectional profile. In an example, each spring biases two of the plurality of arms away from each other. In another example, the race is defined by the curtain plate. In yet another example, an analysis instrument includes the curtain chamber.

In another aspect, the technology relates to a method of manufacturing a curtain chamber, the method including: providing an orifice plate; providing a curtain plate; disposing a seal into at least one of the orifice plate and the curtain plate; disposing a spring-loaded biasing element into at least one of the orifice plate and the curtain plate; disposing the curtain plate adjacent the orifice plate to engage the spring-loaded biasing element with a detent defined by an opposing surface of at least one of the orifice plate and the curtain plate; and compressing the seal between the orifice plate and the curtain plate, wherein compressing the seal configured the curtain chamber in an operational condition. In an example, disposing the curtain plate adjacent the orifice plate includes advancing the curtain plate substantially axially along an axis of the orifice plate to engage the spring-loaded biasing element. In another example, disposing the spring-loaded biasing element into at least one of the orifice plate and the curtain plate includes inserting a housing of the spring-loaded biasing element into a bore defined by the at least one of the orifice plate and the curtain plate such that a movable component of the spring-loaded biasing element projects beyond a surface of the at least one of the orifice plate and the curtain plate. In yet another example, a central axis of the detent is misaligned from a central axis of the spring-loaded biasing element. In still another example, the misalignment between the detent central axis and the spring-loading biasing element central axis biases the curtain plate towards the orifice plate.

In another example of the above aspect, the spring-loaded biasing element extends radially relative to a central axis of the curtain plate. In an example, the spring-loaded biasing element includes a plurality of spring-loaded biasing elements. In another example, compressing the seal compresses the seal between facing surfaces of the orifice plate and the curtain plate different than the opposing surfaces of the orifice plate and the curtain plate. In yet another example, the seal includes Teflon. In still another example, compressing the seal includes loading a spring disposed within the seal.

In another example of the above aspect, the method further includes introducing a curtain gas flow rate of greater than about 12 L/min to the curtain plate, wherein the curtain gas flow rate greater than 12 L/min defines the operational condition.

In another aspect, the technology relates to a mass analysis system including a curtain chamber including: an orifice plate; a curtain plate screwlessly engaged with the orifice plate, and wherein when the orifice plate is screwlessly engaged with the curtain plate, the mass analysis system is in an operational condition; and a seal disposed in a race defined by at least one of the orifice plate and the curtain plate, wherein the seal contacts both of the orifice plate and the curtain plate, wherein when the seal is compressed against both the orifice plate and the curtain plate, the mass analysis system is in an operational condition. In an example, the operational condition is defined at least in part by a curtain gas flow rate of greater than 12 L/min introduced to the curtain chamber. In another example, the operational condition is further defined at least in part by a gas throughput to a vacuum chamber adjacent the curtain chamber of greater than 10 L/min.

DETAILED DESCRIPTION

Figure 1:
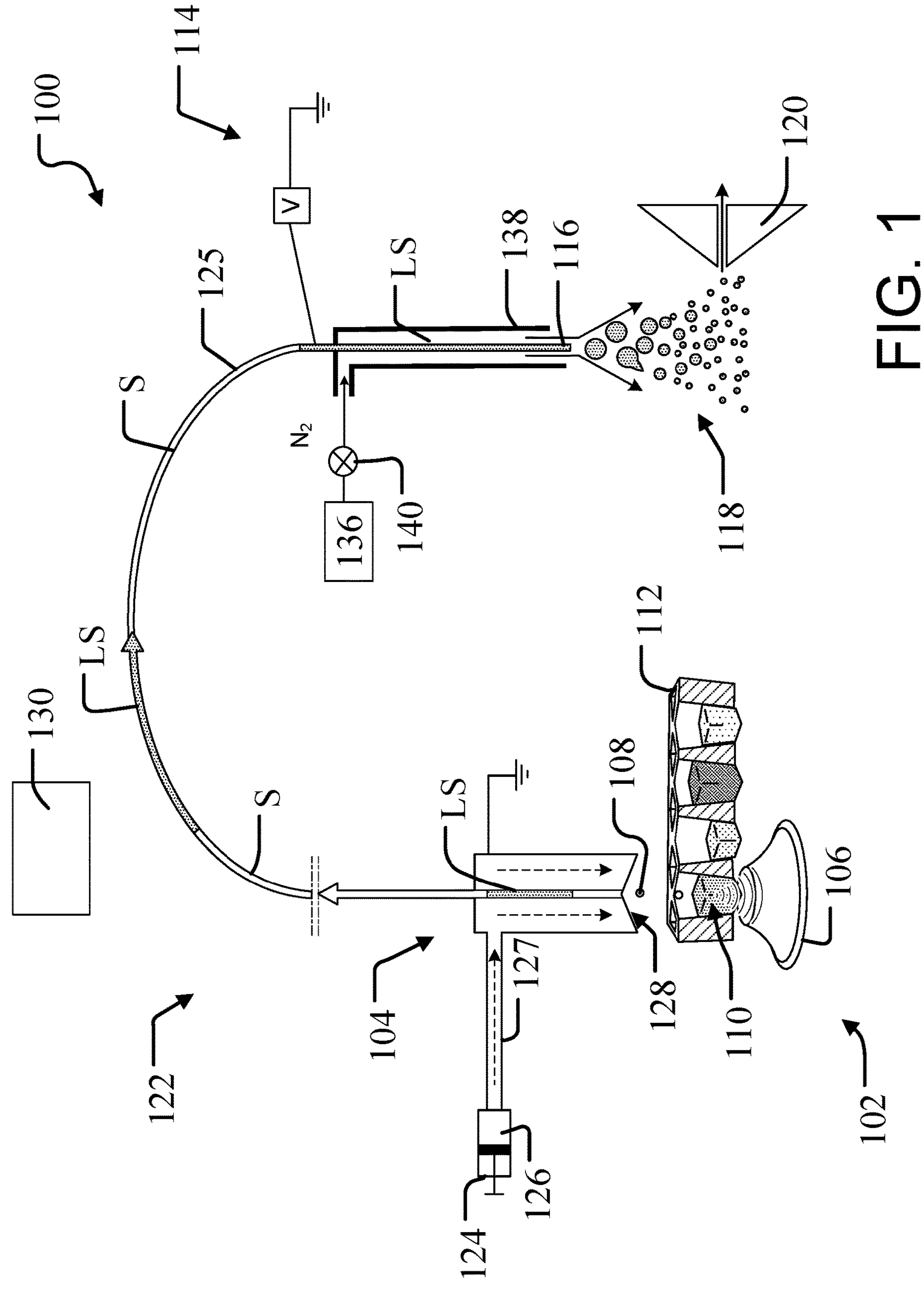
FIG. 1 is a schematic view of an example analysis system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as an MS device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 110 of a well plate 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are transformed into the gas phase. A liquid handling system 122 (e.g., including one or more pumps 124 and one or more conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to and can be configured to operate any aspect of the system 100. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The nebulizing gas flow interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample. The liquid discharged may include discrete volumes of liquid samples LS received from each reservoir 110 of the well plate 112. The discrete volumes of liquid samples LS are typically separated from each other by volumes of the solvent S (hence, as flow of the solvent moves the liquid samples LS from the OPI 104 to the ESI source 114, the solvent may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a DMS) that is disposed between the ionization chamber 118 and the mass analyzer detector 120 and is configured to separate ions based on their mobility difference under high-field and low-field conditions). Such a DMS is depicted in more detail below in FIG.

2. Additionally, it will be appreciated that the mass analyzer detector 120 can comprise a detector that can detect the ions that pass through the analyzer detector 120 and can, for example, supply a signal indicative of the number of ions per second that are detected.

Figure 2:
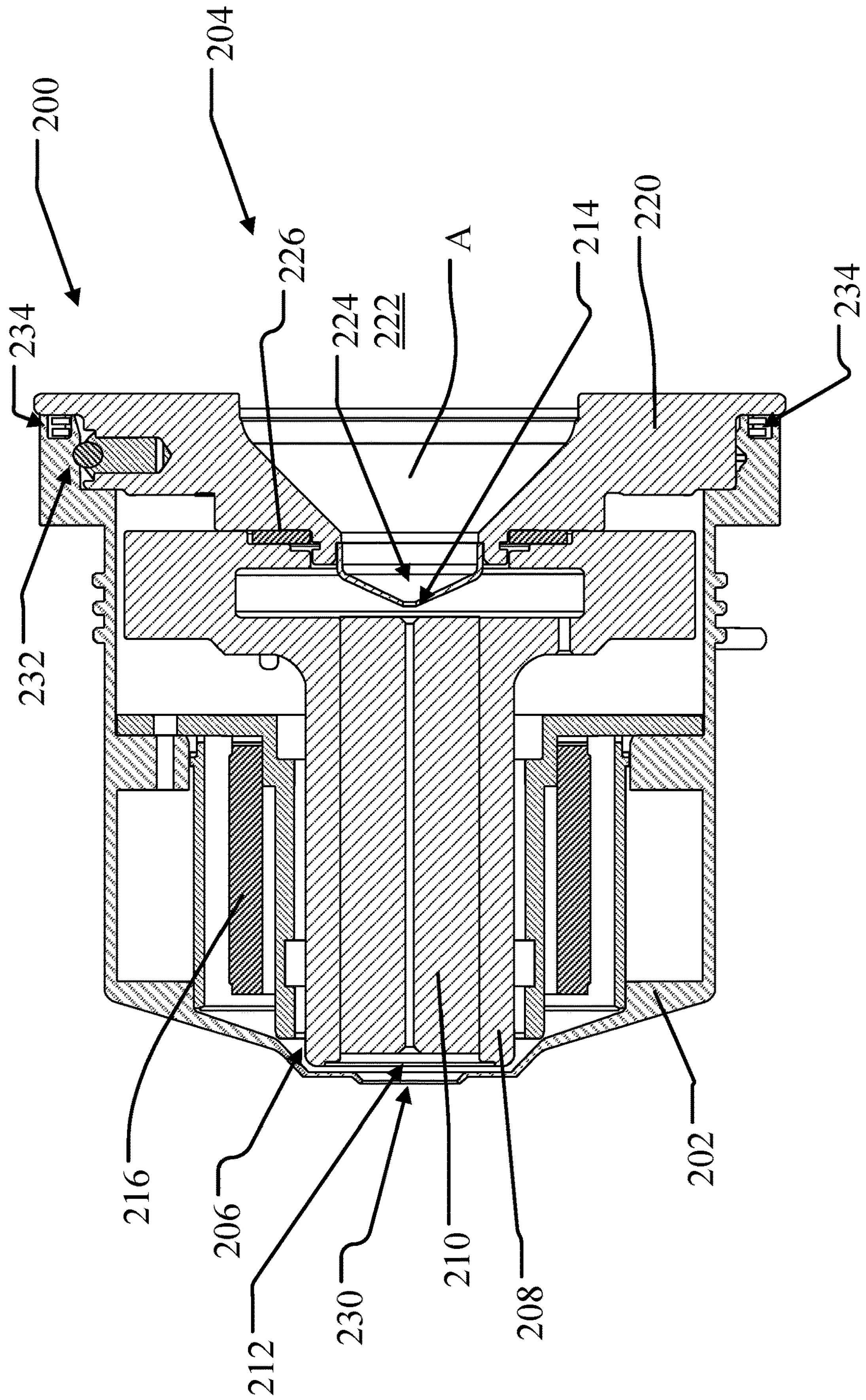
FIG. 2 depicts a partial section view of an example differential mobility spectrometer (DMS).

FIG. 2 depicts a partial section view of an example DMS 200, though the improved curtain plate technologies described herein may be used in mass analysis systems that do not necessarily include a DMS (e.g., an MS device) or that includes a combination DMS-MS device. The components of the differential mobility spectrometer 200 are disposed in a curtain plate 202 that is adjacent a mass spectrometer 204. The curtain plate 202 closes off the curtain chamber 206 and contains a DMS cell 208, which is typically made of a ceramic material. A plurality of DMS electrodes 210 are disposed within the cell 208 and form an inlet 212 at a first end thereof, and an outlet 214 at a second end thereof. One or more heaters 216 may be disposed proximate the cell 208, or in some configurations substantially surround the cell 208. Where heaters are used, the heater(s) 216 may be surrounded by a volume of ceramic beads (not depicted) to more evenly distribute heat emitted therefrom. In another example, one or more additional heaters (not shown) may be disposed external to the curtain plate 202, in the ion source and proximate the curtain plate aperture 230. An orifice plate 220 at least partially defines the curtain chamber 206 and is disposed proximate the outlet 214 and within the boundaries of and adjacent the curtain plate 202. The orifice plate 220 acts as an inlet to the vacuum chamber 222 of the mass spectrometer 204, via a vacuum chamber inlet or orifice aperture 224. An orifice heater 226 may be disposed proximate or around the orifice plate 220. Curtain gas is introduced into the curtain plate 202, but no inlet is depicted in this figure.

In operation, a curtain gas is delivered via an inlet and flows towards the inlet 212 of the DMS cell 208. The curtain gas ultimately enters the curtain chamber 206 where a portion of the gas flows into the inlet 212 and through the DMS cell 208 as a transport gas. An excess volume of the curtain gas above the volumetric flow rate sampled into the orifice plate aperture 224 flows outward through a curtain plate aperture 230. This outward current gas flow is in a direction opposite the ions entering the curtain chamber 206. In a sufficiently sealed system, the transport gas flow rate into the orifice plate aperture 224 and excess volume of curtain gas through the curtain plate aperture 230 are measurable. In examples, a flow of about 4.0-40 L/min may pass through the orifice plate aperture 224, while an excess flow of about 0.5-10 L/min may exit the curtain plate aperture 230. In other examples, flow through the office plate aperture 224 may be about 10.0-30 L/min, about 15.0-20 L/min, or about 16 L/min, and flows through the curtain plate aperture 230 may vary. Significant deviations from the curtain gas outflow measurements are indicative of a leak in the curtain chamber 206 between the orifice plate 220 and curtain plate 202, which can significantly impair robustness, sensitivity, and mobility resolution. The DMS 200 of FIG. 2 includes a number of structures that interface so as to adequately seal the curtain chamber 206 during operation. These structures include a plurality of biasing elements 232 that secure the curtain plate 202 to the orifice plate 220 without the need for screws, while still being able to maintain an adequate seal. Each of the biasing elements 232 extend substantially radially from a central axis A of the curtain plate 202. A seal 234 engages both the orifice plate 220 and curtain plate 202, and is made from materials that resist leakage or degradation at high operational temperatures and pressures. The seal 234 is circular, round, or ring-shaped, and as such is depicted in two locations in FIG. 2. Installation I of the curtain plate 202 is axially along axis A, until the biasing elements 232 engage, and the seal 234 compresses. In examples, the biasing elements 232 may engage with a sealing groove or other uniform structure in the curtain plate 202. Rotation of the curtain plate 202 about axis A may be required to engage the biasing elements 232 with corresponding, discrete detents in the curtain plate 202, if utilized. These components are described in more detail in the context of FIG. 3.

Figure 3:
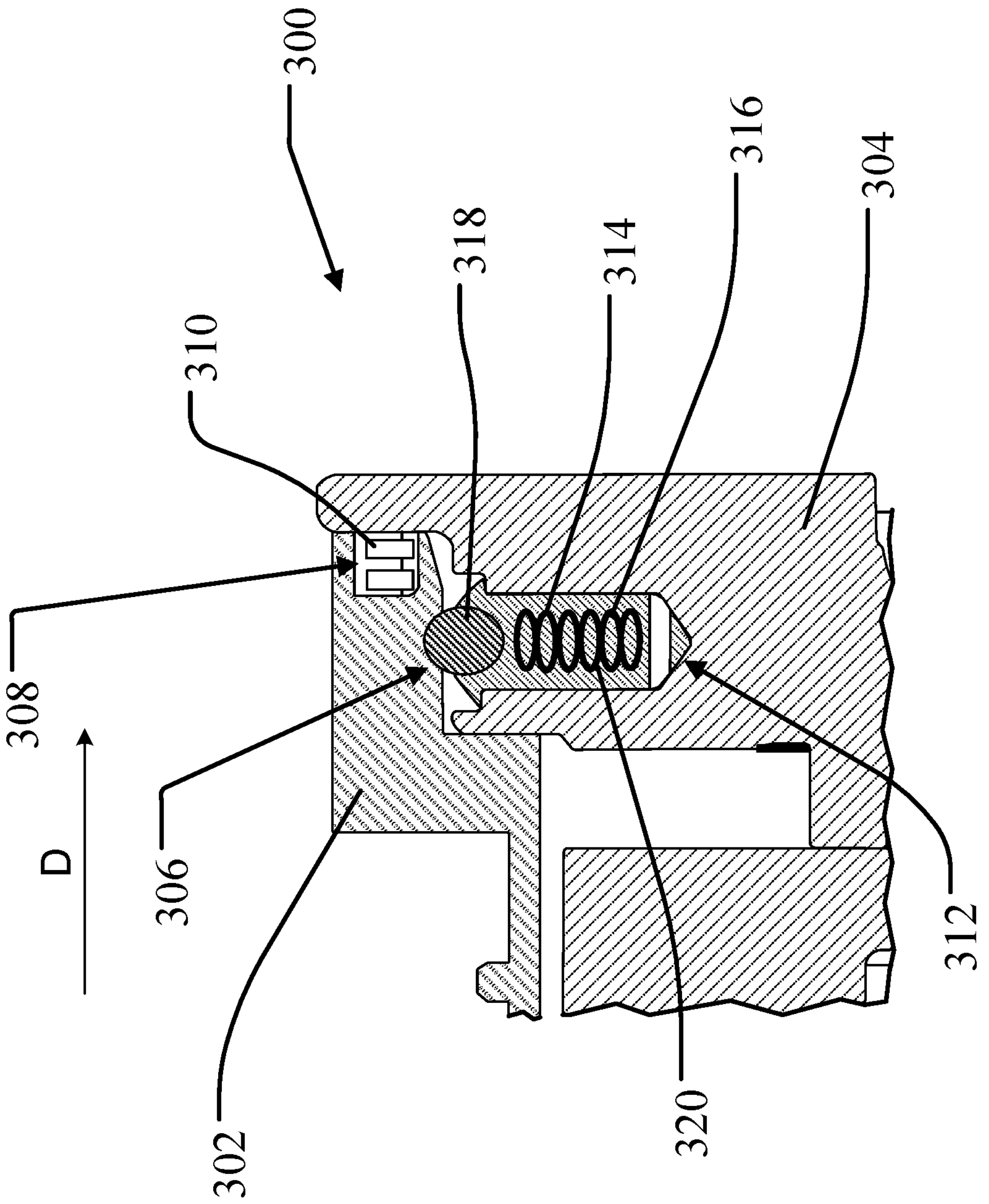
FIG. 3 depicts an enlarged partial section view of a sealing interface of a curtain chamber.

FIG. 3 depicts an enlarged partial section view of a sealing interface 300 of a curtain chamber, such as depicted in FIG. 2. The interface 300 is located at the contacting portions of a curtain plate 302 and an orifice plate 304. The curtain plate 302 defines a plurality of detents or bores 306 within an inner surface thereof, although only a single detent or bore 306 is shown in FIG. 3. Further, the curtain plate 302 also defines a race 308 around a perimeter thereof that faces the orifice plate 304. The race 308 receives a seal 310, as depicted in more detail in FIG. 4. The orifice plate 304 defines a bore or receiver 312 into which a biasing element 314 is received. A corresponding number of detents or bores 306 and biasing elements 314 are utilized, for example, three, four, or more may be utilized and are generally evenly distributed about the perimeter of the curtain plate 302 and orifice plate 304. The biasing element 314 may be a ball plunger that includes a body 316 received in the bore 312, and a ball 318 that projects at least partially outward from the body 316 due to the force of a spring 320. Thus, the ball 318, projects beyond a facing surface of the curtain plate 302 and into the corresponding detent or bore 306. The projecting portion of the biasing element 314 may, in other examples, be any of conical, ovoid, frustoconical, toothed, or other form factor. In examples, an axis of the detent or bore 306 may be misaligned with an axis of the biasing element 314, which may force the curtain plate 302 in a direction D, which helps to compress the seal 310 against the orifice plate 304.

Other configurations similar to those depicted in FIG. 3 are contemplated. For example, the biasing element 314 may be disposed in the curtain plate 302, while the mating detent or bore 306 may be disposed in a facing surface of the orifice plate 304. In another example, biasing elements 314 may be disposed in each of the orifice plate 304 and curtain plate 302, and are associated with a corresponding number of detents or bores 306 in both components. In other examples, the race 308 may be defined by the orifice plate 304 and the seal 310 disposed therein. Multiple seals 310, in one or more of the orifice plate 304 and curtain plate 302, may also be utilized. Regardless of configuration, the technologies described herein eliminate the need for screws to secure the curtain plate to the orifice plate of a curtain chamber. This is advantageous, in that an end user of an analytical instrument can easily remove the curtain plate for inspection or cleaning without the need for tools to remove any screws. Further, removal and reinsertion of screws must be performed with extreme caution, so as to prevent inadvertent fracturing or breakage of the ceramic orifice plate, e.g., during tightening of the screws. Once removed, the interior components of the curtain chamber may be inspected, cleaned, replaced, etc. Thereafter, the curtain plate may be reinstalled without screws to an operational condition. In the operational condition, the analytical instrument may operate at required internal pressures and temperatures while displaying minimal acceptable leakage at the interface (as measured at the orifice plate and curtain plate apertures). The screwless engagement contemplated in the present disclosure makes apparent to the end user that such removal is acceptable and will not void any warranty, for example.

The screwless, sealed configuration depicted above in FIGS. 2 and 3 display a marked performance improvement over known curtain plate configurations that utilize a screwed connection between the steel curtain plate and the ceramic orifice plate, but without a seal between those two components. The screwed prior art configurations described above may also incorporate the biasing elements described above in the context of FIGS. 2 and 3. The contact between the curtain plate and orifice plate was sufficient (even in the absence of a seal) because the volumetric flow of curtain gas was relatively low compared to more advanced systems presently in use (e.g., such as depicted in FIG. 2). The much higher gas flows present in current, high end instruments necessitates better seals than were ever needed before. Thus, the present sealed configuration can still accommodate total curtain gas flows greater than 12 L/min, even in the absence of screws as required in the prior art.

Figure 4:
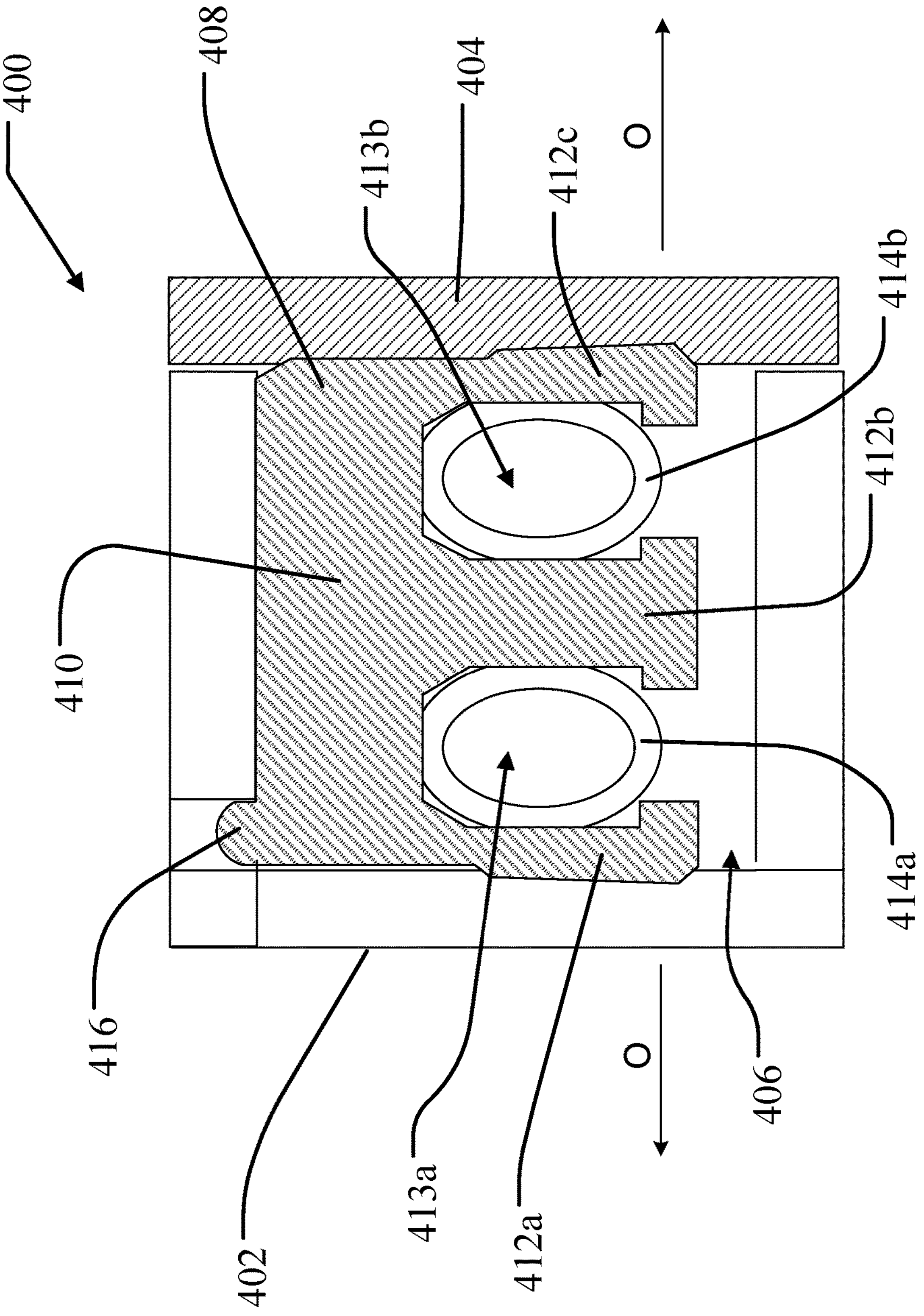
FIG. 4 depicts an enlarged partial section view of a sealing interface of a curtain chamber.

FIG. 4 depicts an enlarged partial section view of a sealing interface 400 of a curtain chamber. The sealing interface 400 is located at an interface of the curtain plate 402 and the orifice plate 404. A race 406 is defined by the curtain plate 402, but in other examples, may be instead defined by the orifice plate 404. Regardless, the race 406 is configured to receive a seal 408 that in this case has a substantially E-shaped cross-sectional profile. The E-shaped profile includes a base portion 410 and a plurality of arms 412*a*, 412*b*, 412*c* spaced apart by corresponding gaps or openings 413*a*, 413*b*. The outer arms 412*a*, 412*c* are biased away from each other by a force exerted by two springs 414*a*, 414*b*, disposed between the arms 412*a*, 412*b*, 412*c*. The exerted force spreads the arms 412*a*, 412*c* outward O away from each other. In this condition, the seal 408 has a maximum seal depth dimension greater than the depth of the race 406, this allowing the seal 408 to compress when the curtain plate 402 is secured relative to the orifice plate 404. As the seal 408 is compressed, the springs 414 are loaded, thus forcing the arms 412*a*, 412*c* outward. A retainer 416 projecting from the seal 408 may help retain the seal 408 within the race 406, for example, during removal of the curtain plate 402.

The E-shaped profile of the seal 408 may be manufactured from any material or combination of materials that provides effective sealing against the operational pressures and temperatures in a curtain chamber. In examples the E-shaped profile may be manufactured in whole or in part preferentially of materials that are free of chemical outgassing at the maximum temperatures encountered in the source or curtain chamber. One example of such a material is polytetrafluoroethylene (PTFE), manufactured under the name TEFLON, by The Chemours Company, although other materials may also be used, provided that they do not exhibit outgassing at the desired temperatures and pressures. Such materials may include polyether ether ketone (PEEK) or polyetherimide (PEI), the latter being manufactured under the name ULTEM by Curbell Plastics, Inc. The springs 414 may be manufactured, e.g., of stainless spring steel, or austenitic nickel-chromium-based superalloys, such as manufactured by Specialty Metals Corporation under the trade name INCONEL. The springs may be circular or canted. Other seal configurations that meet the required or desired performance requirements are also contemplated. For example, a seal having a U-shaped profile and utilizing a single spring may be utilized. In another example, the spring may be completely surrounded by the flexible seal (e.g., having neither an E- or U-shaped profile).

Figure 5:
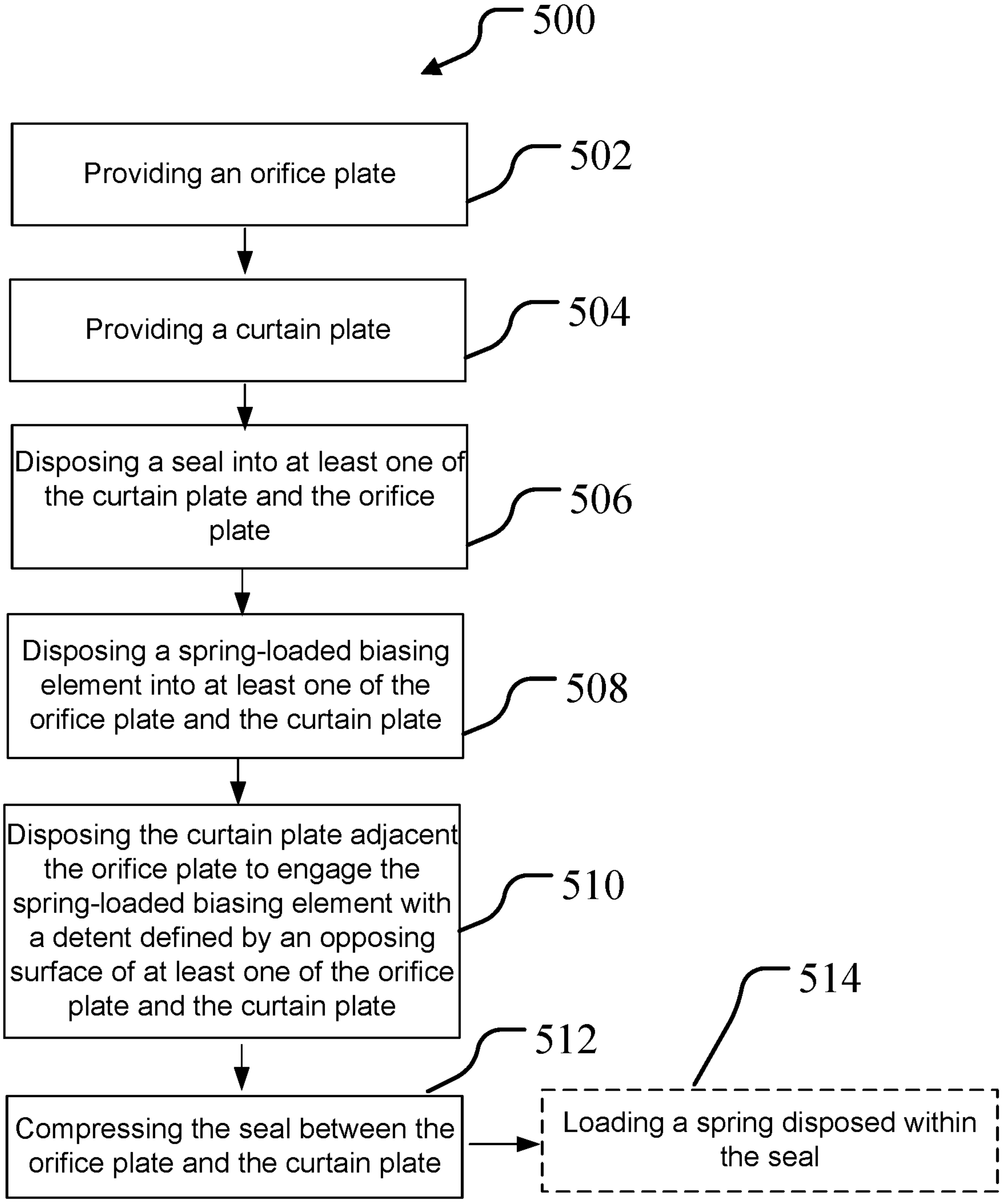
FIG. 5 depicts a method of manufacturing a curtain chamber of a mass analysis instrument.

FIG. 5 depicts a method 500 of manufacturing a curtain chamber for a mass analysis instrument. Notably, the disclosed method 500 allows for the attachment of a curtain plate to an orifice plate of a mass analysis instrument without the use of screws. The method 500 begins with operation 502, providing an orifice plate, along with operation 504, providing a curtain plate. In operation 506, a seal is disposed into at least one of the orifice plate and the curtain plate, for example, in a race or channel defined therein. In operation 508, a spring-loaded biasing element is disposed into at least one of the orifice plate and the curtain plate. In examples, the biasing element is disposed in the opposite component from the seal, but this disclosure contemplates configurations where both the biasing element and the seal are disposed in the same component. The curtain plate is screwlessly secured to the orifice plate in operation 510. More specifically, operation 510 includes disposing the curtain plate adjacent the orifice plate to engage the spring-loaded biasing element with a detent defined by an opposing surface of at least one of the orifice plate and the curtain plate. The spring-loaded portions of the biasing element are forced into the body of the biasing element as the curtain plate is advanced axially along the orifice plate. When the detents are adjacent the spring-loaded portions, those portions then project into the detents, thereby holding the curtain plate in place. Substantially simultaneously with the spring-loaded portions engaging with the detents, operation 512, compressing the seal between the orifice plate and the curtain plate, is performed. Once the seal is compressed, the curtain chamber, or a mass analysis system including such a curtain chamber, is in an operational condition, meaning it may be used for analysis of samples. In examples, this operational condition may be characterized at least in part by a curtain gas flow rate of greater than 12 L/min introduced to the curtain chamber. In other examples, the operational condition may be further defined at least in part by a gas throughput to a vacuum system adjacent the curtain chamber of greater than 10 L/min. In one example, operation 514, loading a spring disposed within the seal, may be performed. Seals that include spring components are depicted herein.

The present teachings also include balancing the forces applied by the biasing element with the forces necessary to ensure compression of the seal. As an example, for the configuration depicted in FIGS. 2 and 3, three biasing elements in the form of ball plungers exert 49 N holding force for a curtain plate against an orifice plate when used in conjunction with a spring loaded Teflon seal with a spring constant of 20-45 N. This ensures an adequate sealing (minimum 18 psi) of a curtain chamber sufficiently to substantially eliminate curtain gas leakage from a curtain chamber.

Figure 6:
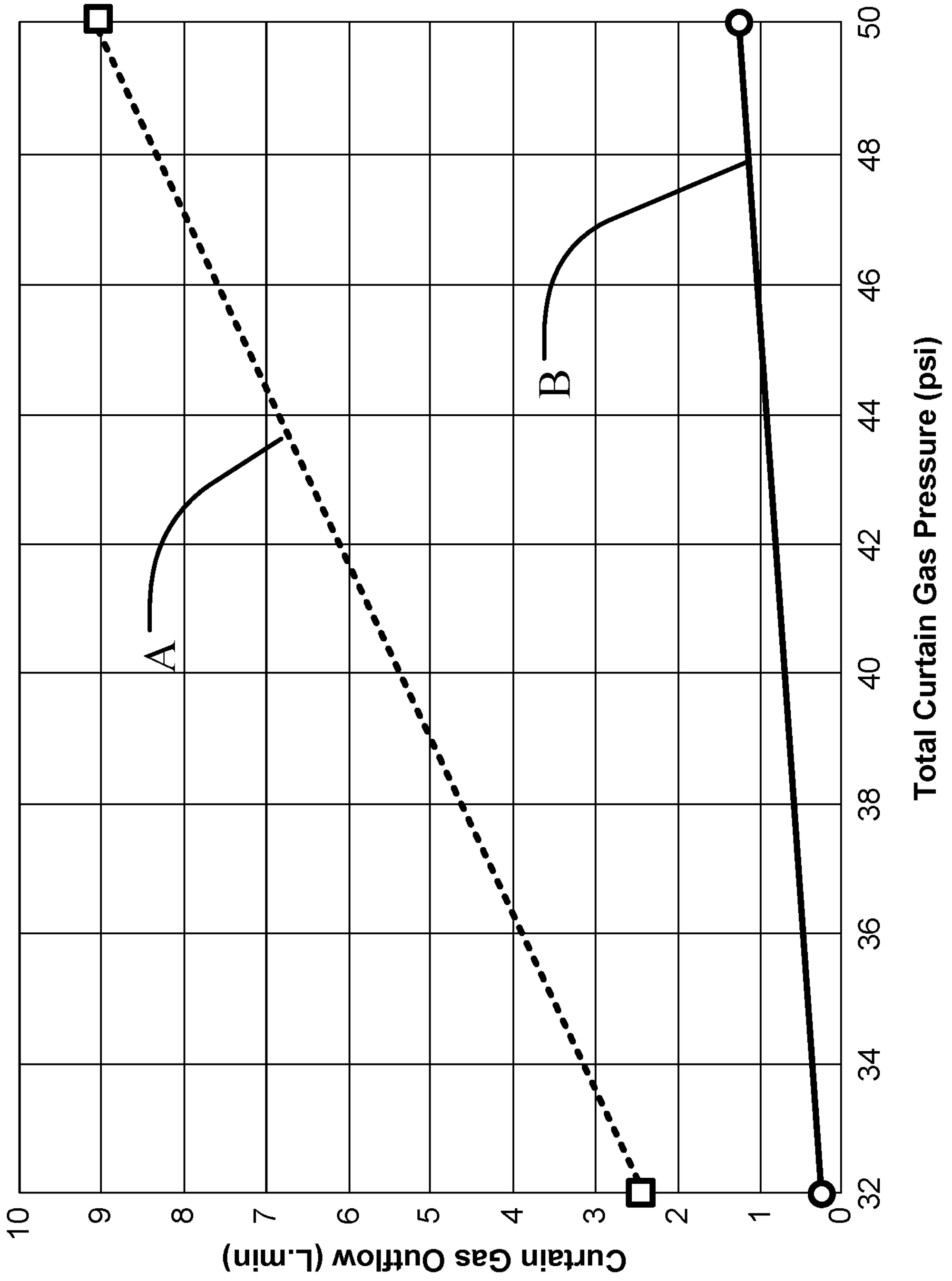
FIG. 6 shows a comparison of curtain gas outflow from the curtain plate aperture for a screwless, sealed configuration of the present disclosure and with a screwed configuration that does not utilize a seal.

FIG. 6 shows a comparison of curtain gas outflow from the curtain plate aperture for a screwless, sealed configuration of the present disclosure and with a configuration that does not utilize a seal. For this data, a triple quadrupole mass spectrometer with vacuum system designed for 16 L/min gas throughput was used. The plot of FIG. 6 shows the measured curtain gas outflow as the total curtain gas flow was varied from 32 to 50 psi, corresponding to approximately 18.5 L/min and 25 L/min total curtain gas flow into the curtain chamber, respectively. Using a known approach where a steel orifice plate is secured directly to a ceramic orifice plate (e.g., without the spring-loaded seal, but with spring-loaded biasing members) (line "B"), curtain gas leakage around the periphery of the curtain chamber limited the total outflow to a maximum of about 1.2 L/min at the highest curtain gas flow and a negligible volumetric flow at the lowest curtain gas setting. Using the screwless, configuration utilizing a seal and spring-loaded biasing members such as depicted herein between the orifice plate and the curtain plate (line "A"), the curtain chamber leakage was substantially eliminated such that the total curtain gas flow corresponded to the sum of the instrument gas throughput and the curtain gas outflow.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A curtain chamber comprising:

an orifice plate defining an orifice plate bore;

a curtain plate disposed adjacent to the orifice plate and defining a curtain plate bore, wherein the orifice plate bore is disposed adjacent the curtain plate bore;

a biasing element comprising a first portion disposed in the orifice plate bore and a second portion disposed in the curtain plate bore, wherein the biasing element biases the curtain plate towards the orifice plate;

a race defined by at least one of the orifice plate and the curtain plate, and wherein the race defines a race depth; and a seal disposed in the race and wherein the seal comprises an uncompressed seal depth greater than the race depth and a compressed seal depth less than the uncompressed seal depth.

2. The curtain chamber of claim 1, wherein the biasing element comprises a ball plunger comprising a body, a ball at least partially disposed in the body, and a spring for biasing the ball at least partially out of the body.

3. The curtain chamber of claim 2, wherein the first portion of the biasing element comprises the ball plunger body.

4. The curtain chamber of claim 1, wherein the seal has an E-shaped cross-sectional profile having a plurality of arms spaced apart by a plurality of openings.

5. The curtain chamber of claim 4, wherein the seal comprises a spring disposed in each of the plurality of openings of the E-shaped cross-sectional profile.

6. The curtain chamber of claim 5, wherein each spring biases two of the plurality of arms away from each other.

7. The curtain chamber of claim 1, wherein the race is defined by the curtain plate.

8. A method of manufacturing a curtain chamber, the method comprising:

providing an orifice plate;

providing a curtain plate;

disposing a seal into at least one of the orifice plate and the curtain plate;

disposing a spring-loaded biasing element into at least one of the orifice plate and the curtain plate;

disposing the curtain plate adjacent the orifice plate to engage the spring-loaded biasing element with a detent defined by an opposing surface of at least one of the orifice plate and the curtain plate; and compressing the seal between the orifice plate and the curtain plate, wherein compressing the seal configured the curtain chamber in an operational condition.

9. The method of claim 8, wherein disposing the curtain plate adjacent the orifice plate comprises advancing the curtain plate substantially axially along an axis of the orifice plate to engage the spring-loaded biasing element.

10. The method of claim 8, wherein disposing the spring-loaded biasing element into at least one of the orifice plate and the curtain plate comprises inserting a housing of the spring-loaded biasing element into a bore defined by the at least one of the orifice plate and the curtain plate such that a movable component of the spring-loaded biasing element projects beyond a surface of the at least one of the orifice plate and the curtain plate.

11. The method of claim 8, wherein a central axis of the detent is misaligned from a central axis of the spring-loaded biasing element.

12. The method of claim 11, wherein the misalignment between the detent central axis and the spring-loading biasing element central axis biases the curtain plate towards the orifice plate.

13. The method of claim 8, wherein the spring-loaded biasing element extends radially relative to a central axis of the curtain plate.

14. The method of claim 8, wherein the spring-loaded biasing element comprises a plurality of spring-loaded biasing elements.

15. The method of claim 8, wherein compressing the seal compresses the seal between facing surfaces of the orifice plate and the curtain plate different than the opposing surfaces of the orifice plate and the curtain plate.

16. The method of claim 8, wherein compressing the seal comprises loading a spring disposed within the seal.

17. The method of claim 8, further comprises introducing a curtain gas flow rate of greater than about 12 L/min to the curtain plate, wherein the curtain gas flow rate greater than 12 L/min defines the operational condition.

18. A mass analysis system comprising a curtain chamber comprising:

an orifice plate;

a curtain plate screwlessly engaged with the orifice plate, and wherein when the orifice plate is screwlessly engaged with the curtain plate, the mass analysis system is in an operational condition; and a seal disposed in a race defined by at least one of the orifice plate and the curtain plate, wherein the seal contacts both of the orifice plate and the curtain plate, wherein when the seal is compressed against both the orifice plate and the curtain plate, the mass analysis system is in an operational condition.

19. The mass analysis system of claim 18, wherein the operational condition is defined at least in part by a curtain gas flow rate of greater than 12 L/min introduced to the curtain chamber.

20. The mass analysis system of claim 18, wherein the operational condition is further defined at least in part by a gas throughput to a vacuum chamber adjacent the curtain chamber of greater than 10 L/min.

* * * * *